Patented Apr. 29, 1930

1,756,123

UNITED STATES PATENT OFFICE

CLAUDE W. JARRETT AND GEORGE HOWARD SKERRITT, OF SYRACUSE, NEW YORK, ASSIGNORS TO BROWN-LIPE GEAR COMPANY, OF SYRACUSE, NEW YORK, A CORPORATION OF NEW YORK

FIVE-SPEED TRANSMISSION GEARING

Application filed January 24, 1928. Serial No. 249,023.

This invention relates to transmission gearing for motor vehicles and has for its object such a gearing which is particularly simple and compact in construction, readily assembled and highly efficient and durable in use, and also, a construction by which the conventional type of change speed gearing can be readily equipped with additional gearing to produce in all seven speeds or two additional forward speeds and an additional reverse speed.

The invention consists in the novel features and in the combinations and constructions hereinafter set forth and claimed.

In describing this invention reference is had to the accompanying drawings in which like characters designate corresponding parts in all the views.

Figure 1:
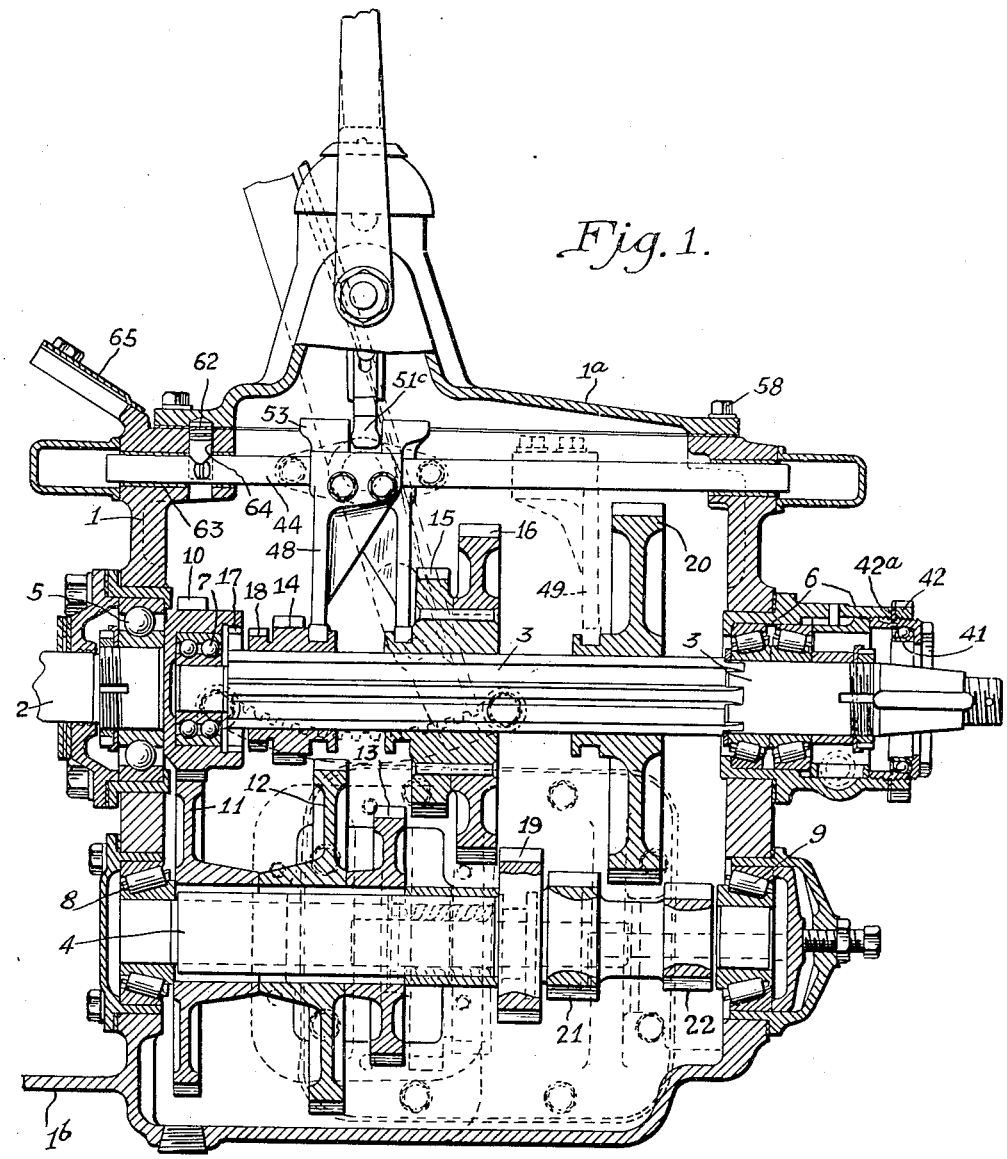
Figure 1 is a lengthwise vertical sectional view of a gearing embodying our invention and associated parts, parts being broken away.

We here show our invention as embodied in a gearing of the conventional sliding gear selective type.

1 designates the housing, 2 the drive shaft, 3 the driven shaft arranged in axial alinement with the drive shaft, and 4 the countershaft arranged parallel to the drive and driven shafts. The drive shaft is here illustrated as the stem of a stem gear journalled in a suitable bearing 5 in the front wall of the housing. The driven shaft is mounted in a suitable bearing structure 6 supported in the rear wall of the housing and it is also journalled in a bearing 7 in the rear end of the drive shaft 2 or in the gear on the drive shaft. The countershaft is also suitably supported at its ends in bearing structures 8 and 9 in the front and rear walls of the housing.

10 is a gear on the drive shaft, this being the gear of the stem gear construction. It will be understood by those skilled in the art that the driving shaft 2 has the driven member of the main clutch of the vehicle mounted thereon, which clutch is operated by a suitable clutch pedal and throw out mechanism contained within a housing $1^b$ formed integral with the front wall of the gear housing 1. 11 is a gear on the countershaft meshing with the gear 10 and through which the countershaft is driven from the drive shaft 2. 12 and 13 are gears on the countershaft.

14 is a gear on the driven shaft. 15 and 16 are gears on the driven shaft. The gear 10 on the drive shaft and the gear 14 have coacting clutch faces 17 and 18 which when engaged produces direct drive. The gears 14, 15 and 16 on the driven shaft are shiftable axially.

19 is another gear on the countershaft rotatable therewith.

Shifting of the double gears 15, 16 to the right from neutral (Figure 1) to bring the gears 16 and 19 into mesh produces normal low or starting speed. This is referred to as normal low because there is another slower low gear which will be referred to as sub low gear. Shifting of the pair of gears 15 and 16 to the left to bring the gear 15 into mesh with the gear 13 produces intermediate speed forward. Shifting of the gear 14 to the left to engage the clutch faces 17, 18 produces direct drive, and shifting of this gear 14 to the right into mesh with the gear 12 produces another speed forward which in this gearing is faster than direct drive or an overdrive. Except for the overdrive feature, the construction thus far described is the same as in the conventional sliding type of gearing.

The invention comprises an additional shiftable gear on the driven shaft, two additional gears on the countershaft and an intermediary gear supported in the housing and meshing with one of the additional gears on the countershaft, the additional gear on the driven shaft being shiftable from neutral in opposite directions into and out of mesh with the other additional gear on the countershaft and the intermediary gear.

The invention, further, includes a second countershaft supported in the housing with a pair of shiftable gears thereon shiftable as a unit into and out of mesh respectively with one of the gears on the countershaft and one of the shiftable gears on the driven shaft, and also means for supporting or assembling the second countershaft and gearing thereon, and also the intermediary gear in the housing.

20 is the additional gear on the driven shaft, and 21 and 22 additional gears on the countershaft. 23 (Figure 3) is the intermediary gear, the gear 20 being, when in neutral, located between the gears 21 and 23 and shiftable to the left from neutral (Figure 1) into mesh with the gear 21 on the countershaft 4 to produce sub low gear and to the right to mesh with the intermediary gear 23 to produce normal reverse. This is here called normal reverse because there is another faster reverse gear.

24 designates the second countershaft supported in the housing; and 25 and 26 the pair of shiftable gears thereon shiftable as a unit, that is, a double gear, they being shiftable into and out of mesh respectively with one of the gears on the countershaft, and with one of the gears on the countershaft and one of the shiftable gears on the driven shaft. When this double gear 25, 26 is shifted to the right, (Figure 3) the gear 25 comes into mesh with the gear 19 on the countershaft while the gear 26 comes into mesh with the gear 16 on the driven shaft producing a second reverse speed which is faster than the normal reverse speed.

Figure 2:
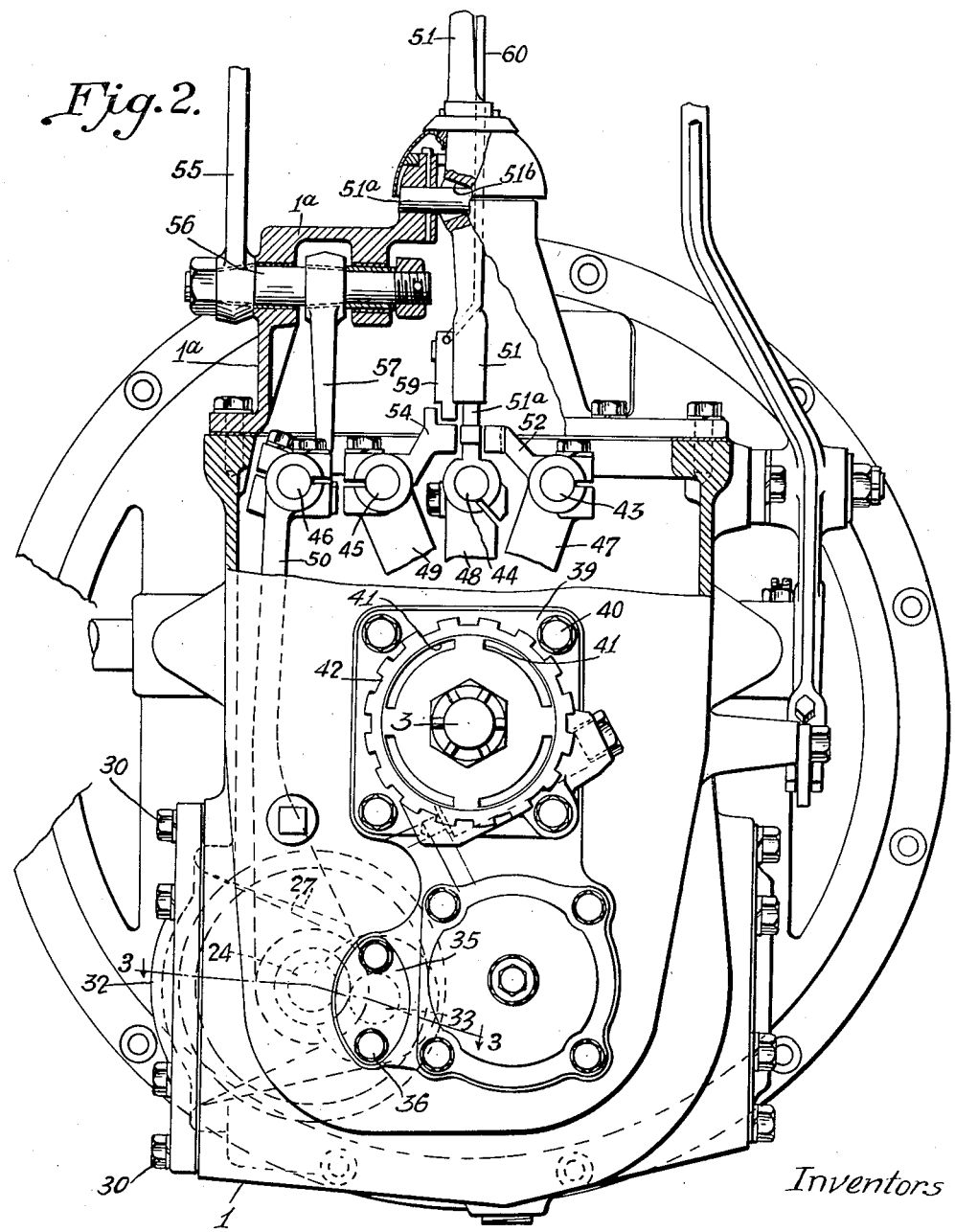
Figure 2 is an end elevation, partly in section, looking to the left of Figure 1.
Figure 4:
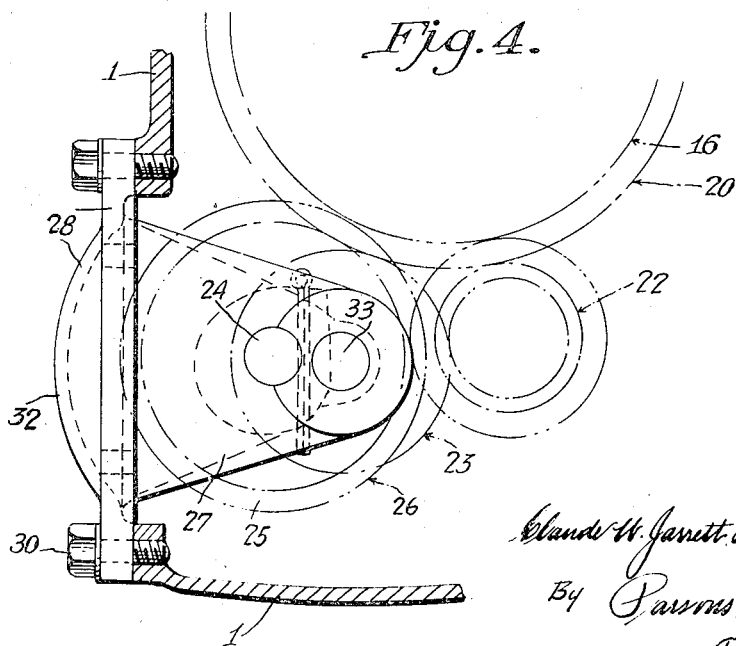
Figure 4 is a diagrammatic view illustrating the trains of gears of the additional gearing shown in Figure 3.

The second countershaft 24 is detachably or separably supported in the housing 1, and the ends thereof are here illustrated as mounted in brackets or arms 27 extending from a base 28 through an opening 29 in the side wall of the casing, the base 28 closing said opening and being secured to the housing 1 by fastening means as cap screws 30 extending through flanges 31 which lap the outer face of the housing 1 around the opening 29, and into the underlying portion of the housing. Preferably, the main countershaft 4 is offset, as seen in Figure 2, to the right hand side of a vertical plane containing the axes of the driving and driven shafts 2, 3, in order to make room for the gears 25, 26 and the support therefor, which are arranged on the left hand side of said plane. Also, to further make room for the gears 25, 26 without enlarging the housing, the base 28 of the support is curved or bulged outwardly as at 32, Figures 2 and 4. The intermediary gear 23 is mounted on the stud 33 supported at one end in the rear wall of the housing 1 and at its other end at 34 in one of the bracket arms 27, the outer end of this stud 33 having a head 35 overlying the outer face of the rear wall of the housing and secured thereto as by screws 36. Both the spindle 24 and the stud 33 are fixed from rotation and suitable antifriction bearings 37, 38 are interposed between them and the respective gears 25, 26 and 38.

The bearing structure 6 for the rear end of the driven shaft 3 is contained in a suitable cap 39 secured by screws 40 to the rear wall of the gear case and adjusting means as a threaded ring 41, and holding means as a nut and lock washer 42, 42$^a$ are associated with the cap.

The shiftable gears are shifted by any suitable mechanism as slide rods having forks thereon connected to the shiftable gear, a selecting and shifting lever thereon common to a plurality of the rods and shifting lever individual to one rod. As here shown there are four slide rods 43, 44, 45 and 46 having thereon forks 47, 48, 49 and 50. The rods 43, 44, 45 are shifted by a single selecting and shifting lever 51 of any well known construction pivoted at 51$^a$ to have a fore and aft movement and shiftable laterally about a fulcrum 51$^b$ on the pivot 51$^a$ to selectively engage notches formed in arms 52, 53, 54 on the rods 43, 44, 45 respectively and when in the notches of any one, the rods are shiftable fore and aft to shift the shifted rod. Normally the engaging lower end 51$^c$ of the lever is located in the notch of the arm 53 of the rod 44.

The rod 46 is shifted by its individual lever 55 mounted on a rock shaft 56 which has an arm 57 coacting with the rod 46. The lever 51 is suitably mounted in the cap 1$^a$, and when the cap is removed, the levers disengage from the shifter rods. Also, the selecting and shifting lever 51 is provided with a lock 59 for preventing the shifting into reverse gear unless the lock is operated, the lock being operated by a rod 60 having a handle located near the handle of the lever 51. This lock forms no part of this invention, and is merely a precautionary measure that may be dispensed with.

In describing the operation, it will be assumed that the movements are those of the lower ends of the levers rather than the handle ends.

Shifting of the lever 51 to the right (Figure 2) brings its engaging end 51$^c$ into the notch of the arm 52 of the left hand shifter rod 43 to select the rod 43, and shifting of the lever 51 rearwardly brings the gear 16 into mesh with the gear 19 producing starting or normal low gear forward. Shifting of the lever 51 forwardly from central position when engaged with arm 52 brings the gear 15 into mesh with the gear 13 producing intermediate speed. Movement of the lever 51 back to neutral disengaging the gears 15 and 13 and shifting the lever 51 laterally into the notch of arm 53 of the middle shifter rod 44 selects the middle shifter rod and movement of the lever 51 forwardly engages the clutch faces 17 and 18 of the gears 10 and 14 producing direct drive. Movement back to neutral position, and then rearwardly brings the gear 14 into mesh with the gear 12 producing the overdrive. Shifting of the lever 51 laterally to the left, Figure 2, from neutral into the notch of the arm 54 of the rod 45 selects said rod 45 and then movement of the lever 51 forwardly or to the left, Figure 1, brings the additional gear 20 on the driven shaft 2 forwardly into mesh with the gear 21 on the countershaft producing sub low gear. Shifting of the lever 51 rearwardly or to the right, Figure 1, while engaged with the arm 54, meshes the gear 20 with the intermediary gear 23 which is in mesh with the gear 22 on the countershaft and produces normal reverse gear.

Figure 3:
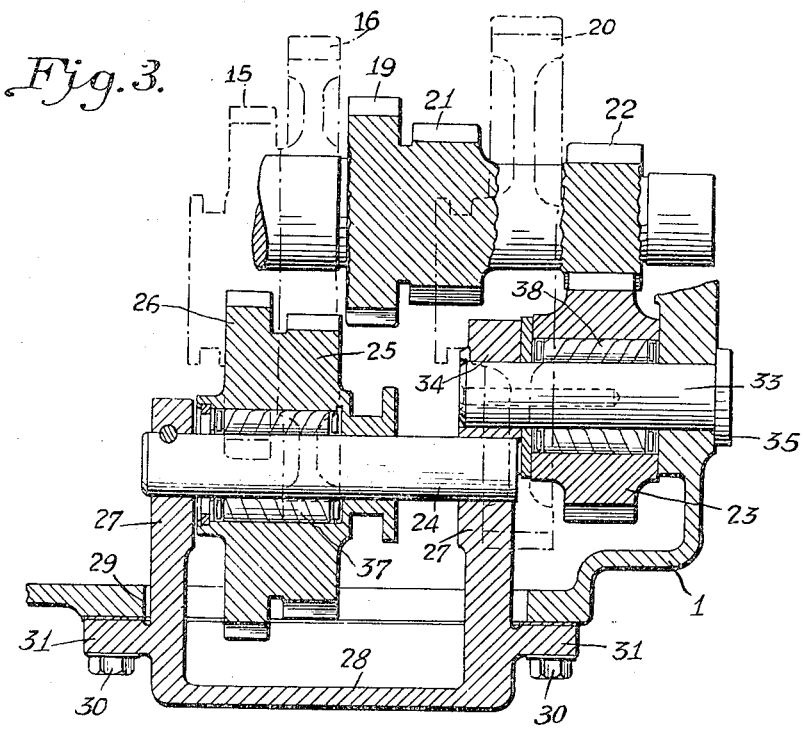
Figure 3 is an enlarged fragmentary sectional view taken approximately on the line 3—3 Figure 2 showing the additional reverse gearing and detachable support therefor and also the normal reverse gear.

Upon shifting of the lever 51 back to neutral and in central position, that is, with its engaging end in the notch of the arm 53 of the rod 44 and then shifting of the lever arm 57 to the right, Figures 1 and 3 by means of the lever 55 shifts the double gear 25, 26 into mesh respectively with the gear 19 on the countershaft and with the gear 16 on the driven shaft producing fast reverse.

This gearing is intended primarily for trucks. Oftentimes a gear lower than normal low or starting gear is desirable to pull the truck out of holes and rough places, and also faster reverse gear than normal is desirable where it is necessary to back up for comparatively long distances as in road construction where the truck can not turn around near the place where the load is to be dumped or received.

Any suitable means may be provided for holding the shifted rod in its shifted position and lock the other rods from movement. The locking means is here designated 62, Figure 1, and any suitable locking means may be employed to hold the selected and shifted rod in shifted position and lock the other rods in neutral position. The particular locking means here shown is of the type disclosed in the application of Wilfred A. Reville, Sr. No. 213,923, which matured into Patent Number 1,719,520, filed August 18, 1927.

The rods are guided in suitable passages 63, Figure 1, formed in the front end wall of the housing 1, and the locking means is located in a recess 64 formed in the end wall and opening into one of said passages 63. The recess is closed and the parts held therein by the margin of the cap 1ª where it laps the upper edge of the end wall.

What we claim is:

1. In a transmission gearing, the combination with a housing, drive and driven shafts mounted in the housing in axial alinement, a countershaft journalled in the housing, gears connecting the drive and the countershafts and coacting gears mounted on the driven shaft and on the countershaft, the gears on the driven shaft being shiftable from neutral into and out of mesh with gears on the countershaft, and the gear on the drive shaft and one of the shiftable gears on the driven shaft having clutch faces, all whereby the gears on the driven shaft are shiftable to produce different speeds; of an additional gear on the driven shaft, two additional gears on the countershaft, an intermediary gear supported in the housing and meshing with one of the additional gears on the countershaft, the additional gear on the driven shaft being shiftable from neutral in opposite directions into and out of mesh with the other additional gear on the countershaft and with the intermediary gear, a second countershaft supported in the housing, a pair of gears thereon shiftable as a unit into and out of mesh respectively with one of said gears on the countershaft and one of the shiftable gears on the driven shaft, and means for shifting the shiftable gears.

2. In a transmission gearing, the combination of a housing, a conventional gear set in the housing including drive and driven shafts in axial alinement, a countershaft, change speed gearing between the shafts, some of the gears being shiftable; a spindle mounted at one end in the wall of the housing, an intermediary gear mounted on the spindle, a gear on the countershaft with which the intermediary gear meshes, a support detachably mounted in the housing and having a bearing in which the other end of the spindle is mounted, a shaft carried by the support, gears mounted on the shaft and shiftable into and out of mesh respectively with a gear on the countershaft and one of the gears on the driven shaft, also, another of the gears on the driven shaft being shiftable into and out of mesh with the intermediary gear, and means for selectively shifting the gears.

3. In a transmission gearing, the combination with a housing, drive and driven shafts mounted in the housing in axial alinement, a countershaft journalled in the housing, gears connecting the drive and the countershaft, coacting gears mounted on the driven shaft and the countershaft, the gears on the driven shaft being shiftable from neutral into and out of mesh with gears on the countershaft and the gear on the drive shaft and one of the shiftable gears on the driven shaft having coacting clutch faces, whereby the gears on the driven shaft are shiftable to produce different speeds; of said housing provided with an opening in one of its walls, an additional shiftable gear on the driven shaft, two additional gears on the countershaft, an intermediary gear supported in the housing and meshing with one of the additional gears on the countershaft, the additional gear on the driven shaft being shiftable from neutral in opposite directions into and out of mesh with the other additional gear on the countershaft and with the intermediary gear, a support extending through the opening in the housing and detachably secured to the housing and closing said opening, a second countershaft carried by the support, a pair of shiftable gears thereon shiftable as a unit into and out of mesh respectively with one of the gears on the countershaft and one of the shiftable gears on the driven shaft, and means for selectively shifting the shiftable gears.

In testimony whereof, we have hereunto signed our names at Syracuse, in the county of Onondaga, and State of New York, this 20th day of January, 1928.

CLAUDE W. JARRETT.
GEORGE HOWARD SKERRITT.